April 5, 1966 H. W. WEPRIN ETAL 3,244,278
APPARATUS FOR WEIGHING AND CLASSIFYING ARTICLES
Filed Aug. 28, 1961 3 Sheets-Sheet 2
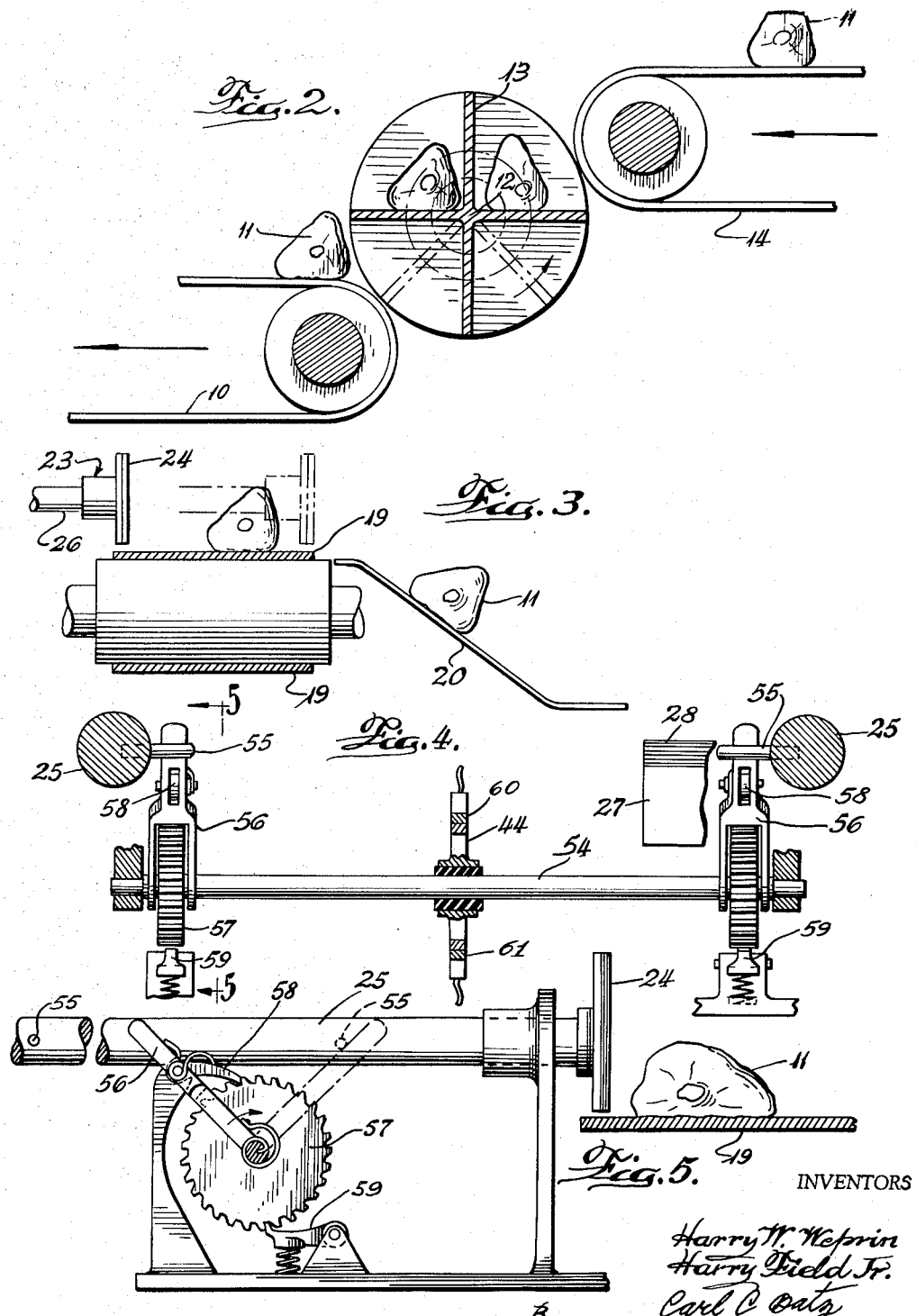
INVENTORS
Harry W. Weprin
Harry Field Jr.
Carl C. Oatz

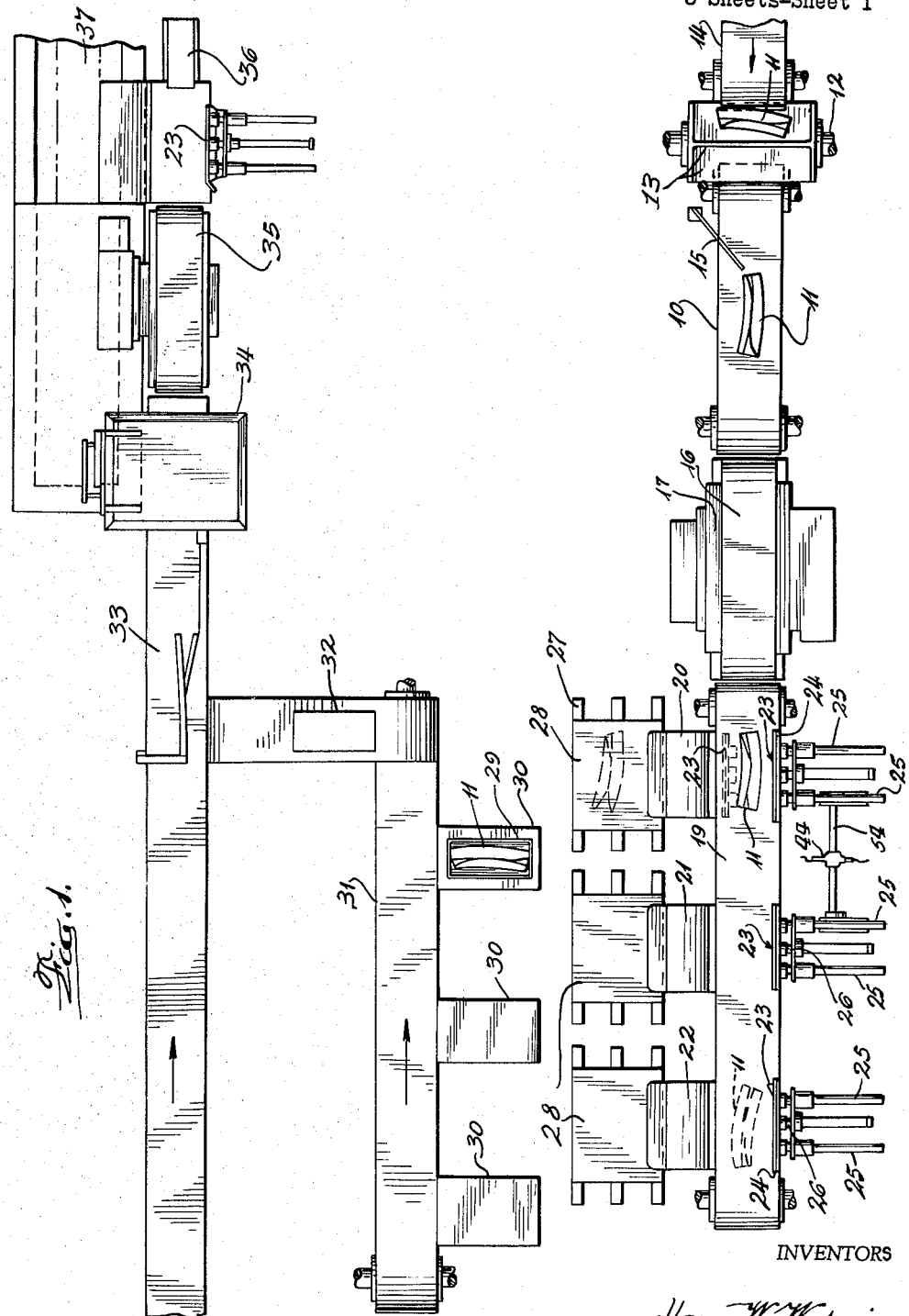

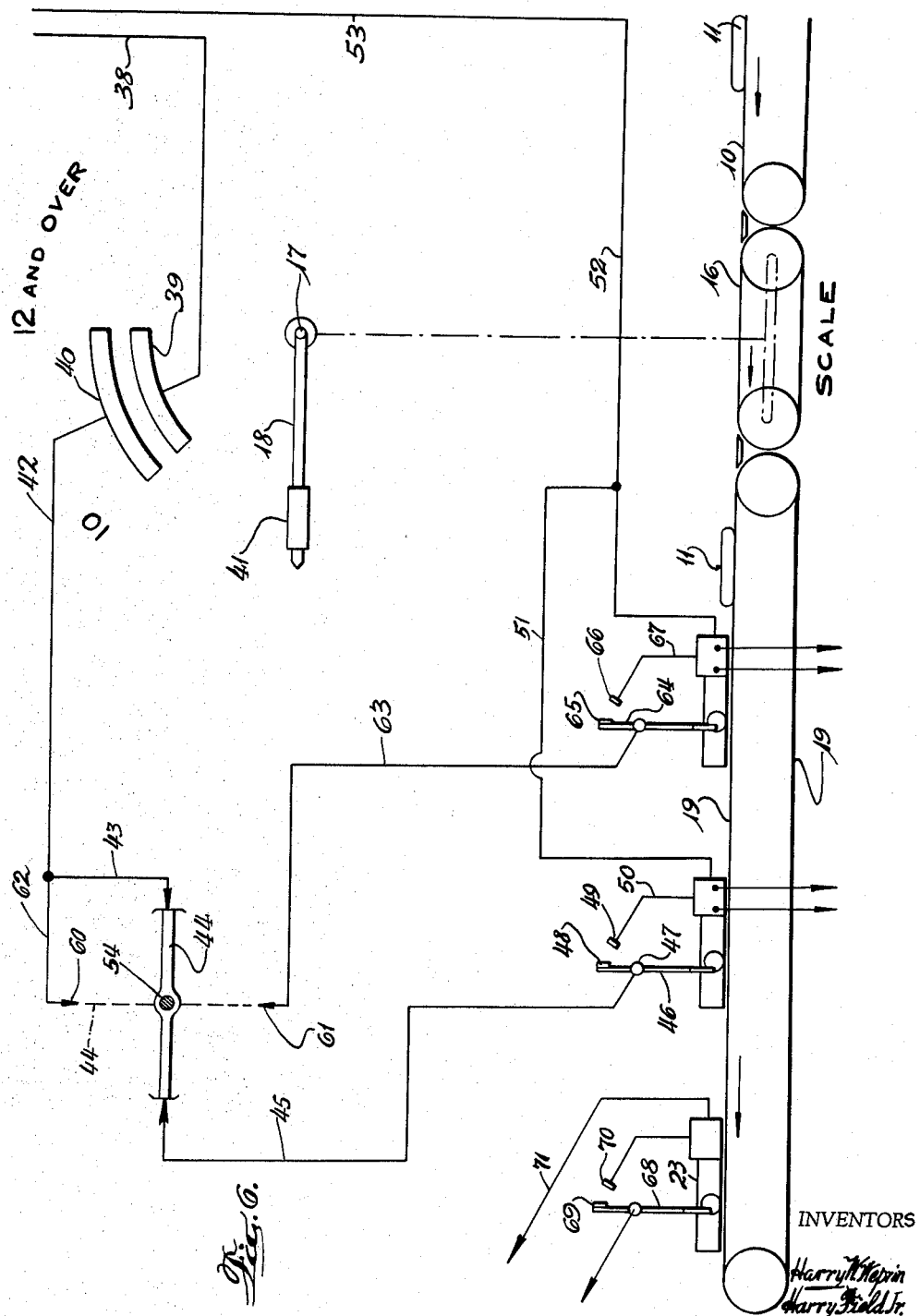

United States Patent Office 3,244,278
Patented Apr. 5, 1966

3,244,278
APPARATUS FOR WEIGHING AND CLASSIFYING ARTICLES
Harry W. Weprin, Chicago, Ill., and Harry Field, Jr., St. Clair Shores, Mich., assignors to Armour and Company, Chicago, Ill., a corporation of Delaware
Filed Aug. 28, 1961, Ser. No. 134,311
8 Claims. (Cl. 209—121)

This invention relates to packaging apparatus and method, and is particularly useful in the weighing and classifying of bodies according to weight for packaging, boxing, etc. For the sake of simplicity and clarity, the invention will be described in connection with the packaging of pork loins, and the like.

An object of the invention is to provide a method and means for spacing loins, meat bodies, or other articles, for weighing, classifying by weight, and wrapping in packaging operations. Another object is to provide apparatus requiring a minimum of handling by operators whereby loins or other bodies may be automatically delivered at spaced stations in accordance with a weight range so that bodies of generally the same weight may be discharged, wrapped, boxed, etc. A further object is to provide a method and means whereby pork loins or other bodies may be spaced apart on a conveyor, and while being conveyed, subjected to weight-responsive means which control ejector mechanism so that the bodies are ejected through discharge stations at spaced points along the conveyor path. A still further object is to provide a plurality of conveyors in tandem relation and means associated therewith for spacing bodies thereon, subjecting said bodies in spaced relation and while being conveyed to weight-responsive means and subsequently to ejector mechanism whereby the bodies are ejected in accordance with their weight ranges for wrapping and packaging. Other specific objects and advantages will appear as the specification proceeds.

The invention is shown, in an illustrative embodiment, by the accompanying drawings, in which:

FIGURE 1 is a broken top plan view of apparatus arranged in accordance with and embodying our invention; FIG. 2, a broken side view in elevation of loin-spacing mechanism; FIG. 3, a transverse sectional detail view of the conveyor and ejecting mechanism; FIG. 4, an enlarged broken sectional view of indexing means which may be employed for causing the alternate discharge of bodies from two consecutive discharge stations; FIG. 5, an enlarged broken and part-sectional view of the indexing mechanism shown in FIG. 4; and FIG. 6, a schematic view of a higher layout which may be employed.

In the illustration given, 10 designates a continuous conveyor belt on which pork loins 11 are deposited in spaced-apart relation. In the specific illustration given, we employ a rotating wheel 12 equipped with four wings 13 for receiving the loins 11 from an incoming conveyor 14, and the wheel 12 is rotated at such a speed as to deposit the loins 11 in spaced-apart, and preferably equally spaced-apart, relation. A deflector 15, or any other suitable means, may be employed for aligning the loin 11 with the conveyor 10 so that it extends longitudinally of the conveyor, as illustrated best in FIG. 1.

The conveyor 10 communicates with the scale conveyor 16 which comprises a scale mechanism 17 equipped with a contact arm 18 which moves in response to the weight of the loin, as will be later described. Associated with the conveyor scale mechanisms 16 and 17 is a console control for the electrical circuits, which enables the operator to adjust the operation of the machine for ejecting loin bodies at the various stations in different weight ranges. The conveyor 16 is continuous, and after receiving a single pork loin 11 continues to weigh the loin and to indicate the weight by its arm 18 (see FIG. 6) while the loin remains upon the belt conveyor 16. The conveyor 16 communicates with a sorting or classifying conveyor 19 which, for the purpose of illustration, is shown equipped with three discharge outlets 20, 21 and 22. In the specific illustration given, the discharge outlets are in the form of chutes which lead laterally from the conveyor 19 and in spaced-apart relation. Opposite each chute is an ejector mechanism 23. Any suitable ejector mechanism may be used. In the illustration given, an ejector shoe 24 is supported upon guides 25 and a power piston 26, when actuated, moves the shoe 24 forwardly so as to discharge the loin opposite it into the corresponding chute. The power piston may be operated by a solenoid, or a hydraulic cylinder, or by any other suitable means.

Below each chute is a table or support 27 bearing a stack of paper sheets 28 and the discharge chute may be readily wrapped within the topmost sheet and a loin then deposited in a box 29 supported on the adjacent table 30. When the box is filled, it may be moved by the operator onto the conveyor belt 31 and from thence onto another belt 32 and delivered by belt 32 onto the conveyor belt 33. The belt 33 carries the box through a stapler or box-closing machine 34 and onto another scale-equipped conveyor 35 which registers the total weight of the loins and controls a printer 36 which automatically stamps the end of the box with the total weight. An ejector 23 is provided for discharging the box onto a take-away conveyor 37.

It will be understood that the classifying conveyor 19 may be provided with any desired number of discharge stations and with any desired number of ejectors 23. In the specific illustration given, we provide two ejectors 23 which are adapted to discharge loins of the same weight range, and means are provided for operating the ejectors 23 alternately. A third, or final, ejector 23 is provided for ejecting all loins weighing more than the weight ranges discharged in the first two stations. By way of example, loins weighing between 10 and 12 pounds are discharged at the first two stations 20 and 21, the ejectors at these stations being operated alternately, and loins weighing more than 12 pounds are ejected through the last station 22.

Any suitable electric circuit or control mechanism may be employed for classifying the loins by weight and ejecting them in the manner described above. As shown more clearly in FIG. 6, we provide an electrical circuit in which one incoming lead 38 joins a long arcuate contact 39. Spaced from contact 39 is another arcuate contact 40. The scale arm 18 is equipped with a conductor sleeve 41 adapted to bridge the contacts 39 and 40 when the weight is within the desired range for discharge at stations 20 and 21. If the weight of the loin exceeds that desired to be ejected at stations 20 and 21, the arm 18 swings the contact sleeve 41 beyond the contacts 39 and 40 so that there is no current flow between these arcuate contacts. Assuming that the contact 41 bridges the contacts 39 and 40, the flow of current is through the contacts and thence through lead 42 to a lead 43 and thence through an index conductor arm 44 to lead 45 and thence to a pivoted paddle or finger 46. The finger 46 extends over the classifying conveyor 19 and is adapted to be engaged by the loin 11 passing thereunder. When the paddle 46 is engaged by the loin, it swings upon the pivot 47 to bring the movable contact 48 into engagement with a fixed contact 49. From the contact 49, current passes through lead 50 and thence back through leads 51, 52 and 53 to complete the circuit.

Indexing mechanism is provided for causing the ejector mechanisms 23 at stations 20 and 21 to operate alternately. As best shown in FIGS. 4 and 5, the indexing arm 44 is mounted upon a shaft 54 which extends between the adjacent guides 25 of the ejector mechanisms 23 at the stations 20 and 21. Each guide 25 is provided with an actuating pin 55, as shown best in FIGS. 4 and 5, and the pin actuates the arm 56 carrying a ratchet 57 equipped with spring-urged pawls 58 and 59. As the member 25 at one station is moved forwardly, it indexes shaft 54 one revolution so as to cause it to move one-quarter of a circle, as shown more clearly in FIG. 6. In other words, after the current has passed through lead 43, index arm 44, and lead 45, as heretofore described, the index arm is moved to the position shown in dotted lines in FIG. 6 to connect contact points 60 and 61.

After the index arm has moved to the position shown in dotted lines in FIG. 6, the current flow will be thence through the lead 38, contacts 39 and 40, lead 42, lead 62, and thence through contact 60, arm 44, contact 61, and lead 63 to the pivoted arm 64. When the arm 64 is swung to the left after engagement with the loin 11, the movable contact 65 engages fixed contact 66 and thence the current flow is through lead 67 and leads 52 and 53 to complete the circuit.

From the foregoing description, it will be seen that the ejector mechanisms 23 at the stations 20 and 21 operate alternately due to the action of the indexing arm 44, the circuit for energizing each of the ejector mechanisms being conditioned by the action of the rotating arm 44 and the action of the scale arm 18.

Loins weighing more than the weight range of the loins ejected at stations 20 and 21 are ejected at station 22 by the action of the pivoted paddle or finger 68 which, when engaged by a loin, is moved so that contact 69 engages the fixed contact 70. A separate circuit 71 is energized solely by the moving of contact 69 into engagement with contact 70 so as to cause the ejector 23 to move forwardly so as to direct the loin 11 upon the chute 22.

As the loin 11 is discharged from the conveyor 19, as shown more clearly in FIG. 4, it moves down the chute 20 (21 or 22) and, as shown more clearly in FIG. 3, may be drawn upon the stack of sheets 28 carried by supports 27 and the topmost sheet folded about the loin so that the wrapped loin may then be placed within the carton or container 29.

In the structure as described in the foregoing, the pressure-responsive mechanism with which the conveyor 16 is equipped provides a bridging contact between arcuate contacts 39 and 40 so as to discharge all loin bodies falling within the weight range selected for stations 20 and 21, say, for example, loins weighing between 10 and 12 pounds, and as the loin reaches these stations, the conditioned finger or paddle causes a discharge of the loin at one of the two stations. A specific wiring layout and arrangement has been shown for the alternate discharge of the loins. It will be understood, however, that any memory system or other form of discharge control may be employed. It will be understood that a ball and groove type of memory timer, such as Binks Memory Timer, may be employed for this purpose or, if desired, a control mechanism such as is shown in Enssle U.S. Patent 2,906,526, may be employed. Further, if desired, a memory system such as that described in the Weprin et al. copending application, Serial No. 77,121, filed December 20, 1960, may be employed.

*Operation*

In the operation of the apparatus shown, loins carried by conveyor 14 are deposited upon the wheel 12, which is driven at a rate so as to deposit the loins in spaced-apart relation upon the conveyor 10, the loins preferably being aligned longitudinally of the conveyor and being delivered one at a time upon the weight-responsive conveyor 16. The loin is delivered by mechanism 16 upon the classifying belt 19, and if the weight falls within the selected range such as between 10 and 12 pounds, the loin is discharged at stations 20 or 21, the ejectors 23 being operated alternately through the action of the indexing arm 44. Loins exceeding the weight range selected for stations 20 and 21 are discharged at station 22. The loins as discharged upon the chutes 20, 21 and 22 are wrapped by the sheets 28, placed within the cartons 29 until the same are filled, and the filled cartons directed along conveyors 31, 32 and 33 to box-closing mechanism 34 where the boxes are stapled. The finished box is then again weighed on the totalizer scale conveyor 35 and the final weight stamped upon an end of the carton by the mechanism 36. The box is then ejected by ejector 23, which is similarly controlled by an ejector finger similar to ejector finger mechanism 68, and the box then discharged upon take-away conveyor 37.

In the foregoing operation, the swing-arms 46, 64 and 63 automatically return by gravity to switch-open position to break the circuits after the loins engaging them are ejected. It will be understood that spring means or other means may be employed for operating the ejectors, and such means may become operative when the switches are opened. As previously stated, it will be understood that any number of discharge stations may be employed, and bodies or articles of various types may be discharged along the classifying conveyor 19 according to weights determined by the weight-responsive conveyor mechanism 16. Such weight-responsive mechanism is in turn fed by control conveyor 10 on which the loins or other bodies are equally spaced through the action of the wheel mechanism 12. If desired, a single conveyor may be used, and the weight-responsive means may be associated with a front or initial portion of the conveyor.

While, in the foregoing specification, we have set out a procedure and structure in considerable detail for the purpose of illustrating embodiments of our invention, it will be understood that such details may be varied widely by those skilled in the art without departing from the spirit of our invention.

We claim:

1. In apparatus for packaging bodies of varying weights, conveyor means, means associated with said conveyor means for placing thereon one body at a time, weight-responsive means associated with said conveyor for weighing the body during its initial passage thereon, a plurality of spaced outlets extending laterally of said conveyor to provide discharge stations, ejector means opposite said outlets, electric circuits for controlling the operation of said ejector means and including movable spaced contacts adapted to be engaged by said bodies, and means actuated by said weight-responsive means in accordance with the weight of a body for selectively conditioning a circuit for actuation when the contacts therein are engaged by a body of a predetermined weight.

2. The apparatus of claim 1 in which means are provided for operating the ejector means alternately at at least two stations.

3. In apparatus for packaging bodies of varying weight ranges, first and second conveyors, means associated with said first conveyor for placing thereon one body at a time for passage to said second conveyor, weight-responsive means associated with said first conveyor for weighing the body during its passage thereon, a plurality of spaced outlets extending laterally of said second conveyor to provide discharge stations, ejector means opposite said outlets, electric circuits for controlling the operation of said ejector means and including movable spaced contacts adjacent said ejector means and adapted to be closed by engagement with said bodies, and means actuated by said weight-responsive means in accordance with the weight range of a body for selectively conditioning a circuit for closing when the contacts therein are closed by engagement with said body.

4. The apparatus of claim 3 in which means are provided for depositing said bodies in equally spaced-apart relation on said first conveyor.

5. The apparatus of claim 4 in which a continuous conveyor deposits the bodies upon said first conveyor and in which means are provided for spacing said bodies upon said continuous conveyor.

6. In apparatus for packaging bodies of varying weights, first, second and third conveyors arranged in tandem, means associated with said first conveyor for placing thereon bodies in spaced-apart relation, weight-responsive means associated with said second conveyor for receiving and weighing one body at a time from said first conveyor, a plurality of spaced outlets extending laterally of said third conveyor to provide discharge stations, ejector means opposite said outlets, electric circuits for controlling the operation of said ejector means and including contacts adapted to be closed by engagement with said bodies, and means actuated by said weight-responsive means for selectively conditioning a circuit for closing when the contacts therein are closed by engagement with a body of a predetermined weight.

7. The apparatus of claim 6 in which the outlets are in the form of inclined chutes adapted to direct bodies toward a stack of wrapping paper carried by a support.

8. In apparatus for packaging bodies of varying weight ranges, first and second conveyors, means associated with said first conveyor for placing thereon one body at a time for passage to said second conveyor, weight-responsive means associated with said first conveyor for weighing the body during its passage thereon, a plurality of spaced outlets extending laterally of said second conveyor to provide discharge stations, ejector means opposite said outlets, electric circuits for controlling the operation of said ejector means and including movable contacts adjacent said ejector means and adapted to be closed by engagement with said bodies, means actuated by said weight-responsive means and in accordance with the weight range of a body for actuating at least two of said ejector means for ejecting bodies of the same weight range from two stations, and means for operating said last two ejector means alternately.

References Cited by the Examiner

UNITED STATES PATENTS

| | | | |
|---|---|---|---|
| 1,935,075 | 11/1933 | Brubaker et al. | 209—121 |
| 2,966,414 | 12/1960 | Foster | 99—174 |
| 2,966,772 | 1/1961 | Markau | 53—391 |
| 2,980,541 | 4/1961 | MacDonald | 99—174 |
| 3,031,823 | 5/1962 | Zebarth | 53—391 |
| 3,035,696 | 5/1962 | Campbell | 209—121 |
| 3,093,245 | 6/1963 | Worcester et al. | 209—121 |
| 3,119,457 | 1/1964 | Thompson et al. | 209—121 X |

TRAVIS S. McGEHEE, *Primary Examiner.*

ROBERT A. LEIGHEY, *Examiner.*